US012734514B2

(12) United States Patent
Zhang et al.

(10) Patent No.: US 12,734,514 B2

(45) Date of Patent: Sep. 15, 2026

(54) METHOD FOR PREPARING AMORPHOUS SILICA-ALUMINA ENCAPSULATED METAL OXIDE CATALYST AND APPLICATION THEREOF

(71) Applicants: NANJING TECH UNIVERSITY, Nanjing (CN); NANJING RESOURCES AND ENVIRONMENT ENGINEERING TECHNOLOGY RESEARCH INSTITUTE CO., LTD., Nanjing (CN)

(72) Inventors: Zhuxiu Zhang, Nanjing (CN); Xu Qiao, Nanjing (CN); Tao Wei, Nanjing (CN); Jihai Tang, Nanjing (CN); Mifen Cui, Nanjing (CN); Zihan Zhou, Nanjing (CN); Zhe Zhou, Nanjing (CN); Jinghao Fan, Nanjing (CN); Xian Chen, Nanjing (CN); Zhaoyang Fei, Nanjing (CN); Qing Liu, Nanjing (CN)

(73) Assignees: NANJING TECH UNIVERSITY, Nanjing (CN); NANJING RESOURCES AND ENVIRONMENT ENGINEERING TECHNOLOGY RESEARCH INSTITUTE CO., LTD., Nanjing (CN)

( * ) Notice: Subject to any disclaimer, the term of this patent is extended or adjusted under 35 U.S.C. 154(b) by 586 days.

(21) Appl. No.: 18/217,239

(22) Filed: Jun. 30, 2023

(65) Prior Publication Data

US 2024/0024863 A1 Jan. 25, 2024

(30) Foreign Application Priority Data

Jul. 12, 2022 (CN) ........................ 202210815998.5

(51) Int. Cl.

| | |
|---|---|
| ***B01J 37/00*** | (2006.01) |
| ***B01J 21/04*** | (2006.01) |
| ***B01J 21/08*** | (2006.01) |
| ***B01J 23/745*** | (2006.01) |
| ***B01J 35/50*** | (2024.01) |

(52) U.S. Cl.

CPC ........... *B01J 37/0018* (2013.01); *B01J 21/04* (2013.01); *B01J 21/08* (2013.01); *B01J 23/745* (2013.01); *B01J 35/50* (2024.01)

(58) Field of Classification Search

CPC ............ B01J 21/04; B01J 21/08; B01J 21/12; B01J 23/002; B01J 23/10; B01J 23/22; B01J 23/26; B01J 23/34; B01J 23/72; B01J 23/745; B01J 23/75; B01J 31/0204; B01J 31/0212; B01J 31/0274; B01J 31/0275; B01J 31/1691; B01J 31/183; B01J 31/2239; B01J 35/30; B01J 35/50; B01J 35/53; B01J 35/635; B01J 35/638; B01J 35/647; B01J 37/00; B01J 37/0018; B01J 37/033; B01J 37/086

See application file for complete search history.

(56) References Cited

FOREIGN PATENT DOCUMENTS

| | | |
|---|---|---|
| CN | 107010709 A | 8/2017 |
| CN | 107099051 A | 8/2017 |
| CN | 112794571 B | 7/2021 |

OTHER PUBLICATIONS

Wei, T., et al., 2023, Separation and Purification Technology, 305, 122467. <https://doi.org/10.1016/j.seppur.2022.122467> (Year: 2023).*

Dong, Z., et al., 2017, Journal of the American Chemical Society, 139, 14209-14216. <DOI: 10.1021/jacs.7b07392> (Year: 2017).*

* cited by examiner

*Primary Examiner* — Brian A Mccaig

(74) *Attorney, Agent, or Firm* — Oliff PLC

(57) ABSTRACT

A field of environmental protection and discloses a method for preparing an amorphous silica-alumina encapsulated metal oxide catalyst and application thereof. The catalyst is prepared by filling silica-alumina precursors in tunnels of a monometallic or bimetallic complex and then performing heat treatment. The catalyst has the advantages that acidic sites and oxygen vacancies are highly dispersed, the pore size range is large and the mass transfer efficiency is high, improves the efficiency of a cracking-oxidation tandem reaction, and achieves full purification of carbon/nitrogen pollutants in landfill leachate. The COD removal rate of the landfill leachate reaches 98.3% or above, and the ammonia nitrogen removal rate thereof reaches 98.0% or above. The COD concentration of oxypyrolysis purified effluent is less than 98.7 mg/L and the ammonia nitrogen concentration thereof is less than 24.9 mg/L.

12 Claims, No Drawings

METHOD FOR PREPARING AMORPHOUS SILICA-ALUMINA ENCAPSULATED METAL OXIDE CATALYST AND APPLICATION THEREOF

TECHNICAL FIELD

The present disclosure belongs to the field of environmental protection and relates to a oxypyrolysis bi-functional catalyst for aerobic cracking purification of landfill leachate and a preparation method therefor and application thereof, and in particular relates to an amorphous silica-alumina encapsulated metal oxide catalyst for oxypyrolysis of landfill leachate and a method for carbon/nitrogen pollutants in the landfill leachate to be purified into inorganic substances such as carbon dioxide, water and nitrogen through a cracking-oxidation tandem reaction under the action of this catalyst.

BACKGROUND

Landfill leachate has corrosiveness, biological toxicity, and high pathogenicity. Direct discharge without treatment not only causes environmental pollution, but also endangers human life and health. An existing combined process of "biochemical treatment+membrane separation" has the problems such as long flow, high energy consumption, and secondary pollution to a membrane concentrate. There is an urgent need to develop a chemical reaction-based harmless disposal technology for the landfill leachate to completely convert pollutants in the landfill leachate into harmless substances.

High-volatile carbon/nitrogen pollutants (such as fatty acids and ammonia) in the landfill leachate can be converted into environment-friendly substances through chemical oxidation technologies such as catalytic combustion. However, catalytic combustion cannot be performed on macromnolecular pollutants with relatively low volatility in the form of gaseous molecules, and it is necessary to cleave their chemical bond into small molecules that are prone to oxidation. Patent CN112794571B shows that the advanced oxidation technology can realize oxidative cleavage of chemical bonds of macromolecular organic pollutants, and has formed a tandem process with the biochemical treatment process. However, the advanced oxidation technology can neither form an independent purification process in practical application, nor can it be coupled with the catalytic combustion process due to different operating conditions. Patents CN107010709A and CN107099051A propose an oxypyrolysis it process where cracking and oxidation are coupled, which has been applied in the disposal process of high concentration organic wastewater and waste resin. However, the main component of an oxypyrolysis catalyst is a rare earth modified zeolite molecular sieve. The nano-scale tunnel of zeolite is not conducive to the internal mass transfer of the macromolecular organic pollutants, leading to a decrease in catalytic cracking reaction efficiency and even carbon deposition. After the organic wastewater is disposed in an oxypyrolysis reactor, the COD of effluent still reaches 1000 mg/L. Therefore, the aerobic cracking reactor needs to be connected in series with a catalytic oxidation reactor to achieve standard discharge. However, this increases the purification process flow, operating costs, and process energy consumption.

Amorphous silica-alumina is an important constituent part of a fluid catalytic cracking industrial catalyst. The amorphous silica-alumina has the characteristics of a rich tunnel structure and a wide pore size range, and can improve the mass transfer efficiency of macromolecular substances. It is mainly used for precracking of heavy components in crude oil. However, oxypyrolysis bi-functional catalyst metal oxide/amorphous silica-alumina prepared by existing technologies such as an impregnation method and a grinding method has the defects such as uneven distribution of oxygen vacancies and acidic sites, and agglomeration of metal oxides, and is not suitable for an aerobic cracking process characterized by a cracking-oxidation tandem reaction.

SUMMARY

The present disclosure provides an amorphous silica-alumina encapsulated metal oxide catalyst having the advantages that acidic sites and oxygen vacancies are highly dispersed, the pore size range is large, and the mass transfer efficiency is high and a preparation method therefor and application thereof for the defects such as uneven distribution of oxygen vacancies and acidic sites, and agglomeration of metal oxides of an amorphous silica-alumina supported metal oxide catalyst.

The purpose of the present disclosure is to develop an amorphous silica-alumina encapsulated metal oxide catalyst ($MO_x@SiO_2—Al_2O_3$) with highly dispersed acidic sites and oxygen vacancies and a rich tunnel structure.

A method for preparing an amorphous silica-alumina encapsulated metal oxide catalyst, the method includes the following steps:

placing a metal complex in a vacuum drying device, performing activation at a temperature of 80-120° C. and a vacuum degree of 15-25 Pa for 4-6 h, and then soaking the activated metal complex in a mixed solution of a silicon precursor, an aluminum precursor, an acidic chelating agent and a hydrolysis inhibitor for 3-4 h; and after washing the soaked sample with an alcohol solvent and drying the same to remove the solvent, performing heat treatment on the obtained solid at a high temperature of 500-800° C. for 4-6 h to remove organic components to obtain an $MO_x@(SiO_2—Al_2O_3$ bi-functional oxypyrolysis catalyst with highly dispersed acidic sites and oxygen vacancies and a rich tunnel structure.

In the above-mentioned preparation method, the metal oxide $MO_x$ is one or two of $Fe_2O_3$, $Co_3O_4$, $Cr_2O_3$, $CeO_2$, $V_2O_5$, $Mn_2O_3$ and CuO.

In the above-mentioned preparation method, the metal complex is one of Fe-MIL-101, Fe-MIL-100, Fe-MIL-68, Fe-MIL-100, Cr-MIL-101, Ce-MOF-808 V-MIL-101, V-MIL-68, Mn-MIL-100 and Cu-PCN-222, and alternatively, the metal complex is one of Fe/Cu-MIL-101, Fe/Co-MIL-101, Fe/Mn-MIL-101, V/Cu-MIL-101, Cr/Cu-MIL-101, V/Cr-MIL-101, V/Mn-MIL-101, Fe/Cu-MIL-68, V/Cu-MIL-68, Ce/Cu-MOF-88, Ce/V-MOF-8, Ce/Mn-MOF-88, Ce/Mn-MIL-100, Fe/Cu-MIL-100 and Cu/Mn-PCN-222.

In the above-mentioned preparation method, the silicon precursor is one of tetramethoxysilane, tetraethyl orthosilicate and methyltrimethoxysilane; and preferably, the mass ratio of silicon precursor to metal complex is 9:1 to 11.8:1, and the silicon precursor is the tetramethoxysilane and the tetraethyl orthosilicate.

In the above-mentioned preparation method, the aluminum precursor is one of aluminum isopropoxide, aluminum tri-sec-butoxide, and aluminum di(sec-butoxide) acetoacetate.

In some specific solutions, the mass ratio of aluminum precursor to silicon precursor is 0.11:1 to 0,37:1; and the aluminum precursor is the aluminum tri-sec-butoxide.

In the above-mentioned preparation method, the acidic chelating agent is one of acetic acid and oxalic acid, and the hydrolysis inhibitor is at least one of ethyl acetoacetate, isopropanol and sec-butanol.

In the above-mentioned preparation method, the mass ratio of acidic chelating agent to aluminum precursor is 0.21:1 to 0.63:1; the hydrolysis inhibitor is the ethyl acetoacetate and the sec-butanol, and the mass ratio of ethyl acetoacetate to aluminum precursor is 0.1:1 to 0.3:1; and the mass ratio of sec-butanol to aluminum precursor is 1.6:1 to 4.7:1.

In the above-mentioned preparation method, the alcohol solvent is one or two of methanol, ethanol and sec-butanol.

In the above-mentioned preparation method, based on amorphous silica-alumina, the loading capacity of the metal oxide $MO_x$ is 20-35%.

Determined by ammonia temperature-programmed desorption, the acid content of the bi-functional oxypyrolysis catalyst is 2.3-4.5 mmol/g, and the hydrogen consumption of an oxidation active component is 8.5-17.5 mmol/g.

The pore volume of the bi-functional oxypyrolysis catalyst is 0.8 to 1.7 $cm^3/g$, and the mesoporous pore sizes range from 2.2 nm to 18.5 nm.

An amorphous silica-alumina encapsulated metal oxide catalyst is provided. The catalyst is prepared by using the above-mentioned method.

In the technical solution of the present disclosure, according to application of an amorphous silica-alumina encapsulated metal oxide catalyst prepared by the preparation method to oxypyrolysis purification of landfill leachate, further preferably, the catalyst converts carbon/nitrogen pollutants in the landfill leachate into carbon dioxide, water and nitrogen through a cracking-oxidation tandem reaction.

Further, a catalytic reaction is conducted for the oxypyrolysis purification reaction of the landfill leachate in a circulating fluidized bed reactor; and both the air and the landfill leachate are fed from the bottom of an oxypyrolysis reactor.

Further, the COD concentration of the landfill leachate is 1000-100000 mg/L, and the ammonia nitrogen concentration is 500-5000 mg/L; and the reaction pressure is 0.1-0.2 MPa (gage pressure).

Further, the catalytic reaction temperature is 250-450° C., preferably 300-400° C.;

Further, the feed molar ratio of oxygen to landfill leachate is 0.1 to 5, preferably 1.25-3.

Further, the space velocity is 0.5-3.5 h preferably 1-2.5 $h^{-1}$.

The present disclosure has the following beneficial effects:

The $MO_x$@$SiO_2$—$Al_2O_3$ catalyst created by the present disclosure has highly dispersed acidic sites and oxygen vacancies dual-active catalytic sites, a rich tunnel structure and a large pore size range, so that the mass transfer process of reactants in the catalyst is enhanced, and the efficiency of the cracking-oxidation tandem reaction is improved.

The $MO_x$@$SiO_2$—$Al_2O_3$ catalyst created by the present disclosure achieves that the COD removal rate of the landfill leachate reaches 98.3% or above and the ammonia nitrogen removal rate thereof reaches 98.0% or above. The COD concentration of oxypyrolysis purified effluent is less than 98.7 mg/l, and the ammonia nitrogen concentration thereof is less than 24.9 mg/L in the process of oxypyrolysis purification of landfill leachate.

DETAILED DESCRIPTION

The present disclosure is further explained with the examples below.

Example 1

30 mg of monometallic complex Fe-MIL-101 (Chemsoon Co., Ltd., MIL-101 (Fe)) was activated at 100° C. for 5 h in a vacuum device with a vacuum degree of 20 Pa. Then the activated monometallic complex was soaked in a mixed solution of 300 μL (300 mg) of silicon precursor tetramethoxysilane, 20 μL (20.9 mg) of acidic chelating agent acetic acid, 10 μL (10.3 mg) of hydrolysis inhibitor ethyl acetoacetate and an aluminum precursor (0.099 g/150 μL, 0.0495 g/150 μL and 0.033 g/150 μL of aluminum tri-sec-butoxide/sec-butanol). After soaking for 3 h, centrifugal washing was performed on samples three times with 10 mL of sec-butanol and 10 mL of methanol. Then vacuum drying was performed on the samples at 80° C. for 12 h to obtain the following samples: SiAl-1@MIL-101, SiAl-2@MIL-101 and SiAl-3@MIL-101.

The samples were placed in a tube furnace and heated at a heating rate of 5° C./min in an air atmosphere to 600° C. for 2 h, and the prepared bi-functional catalysts were $Fe_2O_3$@$SiO_2$—$Al_2O_3$-1, $Fe_2O_3$@$SiO_2$—$Al_2O_3$-2 and $Fe_2O_3$@$SiO_2$—$Al_2O_3$-3, respectively.

The prepared catalysts $Fe_2O_3$@$SiO_2$—$Al_2O_3$-1, $Fe_2O_3SiO_2$—$Al_2O_3$-2 and $Fe_2O_3$@$SiO_2$—$Al_2O_3$-3 were determined by ammonia temperature-programmed desorption for the acid contents, which were 4.5 mmol/g, 3.2 mmol/g and 2.9 mmol/g, respectively. The catalysts $Fe_2O_3$@$SiO_2Al_2O_3$-1, $Fe_2O_3$@$SiO_2$—$Al_2O_3$-2 and $Fe_2O_3$@$SiO_2$—$Al_2O_3$-3 were determined by hydrogen temperature-programmed reduction for hydrogen consumption, which was 17.5 mmol/g, 14.8 mmol/g and 11.5 mmol/g, respectively. The pore volumes of the catalysts were 1.7 $cm^3/g$, 1.3 $cm^3/g$, and 0.8 $cm^3/g$, respectively, and corresponding pore sizes ranged from 2.2 nm to 18.5 mu.

The performance test of the catalyst was conducted in a three-stage temperature controlled fluidized bed steel reactor, with a COD concentration of landfill leachate of 8327 mg/L and an ammonia nitrogen concentration of 1263 mg/L. Oxypyrolysis purification of landfill leachate was performed with the bi-functional catalyst with different silica-alumina mass ratios. The catalyst was loaded into an oxypyrolysis reactor, and the landfill leachate was added thereinto through a peristaltic pump. The reaction conditions were as follows: the reaction pressure (gage pressure) was 0.1 MPa, the reaction temperature was 350° C., the feed molar ratio of oxygen to landfill leachate was 2.3, and the space velocity was $1.5 \cdot h^{-1}$. The COD removal rate, the COD concentration, the ammonia nitrogen removal rate, the ammonia nitrogen concentration and the non-methane hydrocarbon concentration of the landfill leachate are listed in Table 1.

TABLE 1

Oxypyrolysis purification results of landfill leachate by $Fe_2O_3@SiO_2—Al_2O_3$ with different silica-alumina ratios

| Catalyst | COD removal rate (%) | COD concentration (mg/L) | Ammonia nitrogen removal rate (%) | Ammonia nitrogen concentration (mg/L) | Non-methane hydrocarbon (mg/m$^3$) |
|---|---|---|---|---|---|
| $Fe_2O_3@SiO_2—Al_2O_3$-1 | 99.9 | 8.3 | 99.5 | 6.9 | 12.8 |
| $Fe_2O_3@SiO_2—Al_2O_3$-2 | 99.4 | 53.6 | 98.8 | 14.7 | 37.3 |
| $Fe_2O_3@SiO_2—Al_2O_3$-3 | 99.0 | 83.1 | 98.0 | 24.9 | 51.3 |

$Fe_2O_3@SiO_2—Al_2O_3$ catalyst in which the mass ratio of aluminum precursor to silicon precursor was 33% had the highest COD and ammonia nitrogen removal rates of the landfill leachate, and the COD and ammonia nitrogen concentrations of purified effluent were 8.3 mg/L and 6.9 mg/L, respectively.

Example 2

According to the conditions in Example 1, the activated Fe-MIL-101 was immersed in a mixed solution of a different silicon precursor, aluminum precursor and part of hydrolysis inhibitor, in the following three cases:

case 1: 300 μL (300 mg) silicon precursor tetramethoxysilane and the aluminum precursor aluminum isopropoxide/sec-butanol (0.099 g of aluminum isopropoxide was dispersed in 150 μL sec-butanol);

case 2: 300 μL (354 mg) silicon precursor tetraethyl orthosilicate and the aluminum precursor aluminum isopropoxide/isopropanol (0.099 g of aluminum isopropoxide was dispersed in 150 μL isopropanol); and case 3: 300 μL. (270 mg) silicon precursor methyltrimethoxysilane and aluminum precursor aluminum di(sec-butoxide) acetoacetate/sec butanol (0.099 g of aluminum di(sec-butoxide) acetoacetate was dispersed in 150 μL sec-butanol).

Other conditions were the same as those in Example 1, and the prepared catalysts were as follows: $Fe_2O_3@SiO_2—Al_2O_3$-4, $Fe_2O_3@SiO_2—Al_2O$-5 and $Fe_2O_3@SiO_2—Al_2O_3$-6.

The prepared catalysts $Fe_2O_3@SiO_2—Al_2O_3$-4, $Fe_2O_3@SiO_2—Al_2O_3$-5 and $Fe_2O_3@SiO_2—Al_2O_3$-6 were determined by ammonia temperature-programmed desorption for the acid contents, which were 4.5 mmol/g. 4.1 mmol/g and 3.7 mmol/g, respectively. The catalysts $Fe_2O_3@SiO_2—Al_2O_3$-4, $Fe_2O_3@SiO_2O_3$-5 and $Fe_2O_3@SiO_2—Al_2O_3$-6 were determined by hydrogen temperature-programmed reduction for hydrogen consumption, which was 16.9 mmol/g, 15.6 mmol/g and 13.5 mmol/g, respectively. The pore volumes of the catalysts were 1.7 cm$^3$/g, 1.5 cm$^3$/g, and 1.5 cm$^3$/g, respectively, and corresponding pore sizes ranged from 2.2 nm to 18.5 nm.

The performance test of the catalyst was conducted according to Example 1. The selected landfill leachate had a COD concentration of 51422 mg/L and an ammonia nitrogen concentration of 964 mg/L. The COD removal rate, the COD concentration, the ammonia nitrogen removal rate, the ammonia nitrogen concentration and the non-methane hydrocarbon concentration of the landfill leachate are listed in Table 2.

TABLE 2

Oxypyrolysis purification results of landfill leachate by $Fe_2O_3@SiO_2—Al_2O_3$ with different silica-alumina precursor

| Catalyst | COD removal rate (%) | COD concentration (mg/L) | Ammonia nitrogen removal rate (%) | Ammonia nitrogen concentration (mg/L) | Non-methane hydrocarbon (mg/m$^3$) |
|---|---|---|---|---|---|
| $Fe_2O_3@SiO_2—Al_2O_3$-4 | 99.9 | 18.3 | 99.2 | 7.4 | 14.2 |
| $Fe_2O_3@SiO_2—Al_2O_3$-5 | 99.8 | 93.2 | 98.1 | 18.5 | 48.3 |
| $Fe_2O_3@SiO_2—Al_2O_3$-6 | 99.8 | 98.7 | 98.2 | 17.4 | 32.6 |

The catalysts prepared with tetramethoxysilane as the silicon precursor and the aluminum tri-sec-butoxide as the silica-alumina precursor had the highest COD and ammonia nitrogen removal rates of the landfill leachate, which were 99.9% and 99.2%, respectively.

Example 3

The monometallic complex was V-MIL-101(MIL-101 (V)).

The activation conditions had the following specific three cases:

case 1: activation at 100° C. for 6 h in a vacuum device of 15 Pa;

case 2: activation at 100° C. for 6 h in a vacuum device of 20 Pa; and case 3: activation at 100° C. for 6 h in a vacuum device of 25 Pa.

Other conditions were the same as those in Example 1.

The prepared bi-functional catalysts were as follows: $V_2O_5@SiO_2—Al_2O_3$-15, $V_2O_5@SiO_2—Al_2O_3$-20 and $V_2O_5@SiO_2—Al_2O_3$-25. The performance test of the catalyst was conducted according to Example 1. The COD removal rate, the COD concentration, the ammonia nitrogen removal rate, the ammonia nitrogen concentration and the non-methane hydrocarbon concentration of the landfill leachate are listed in Table 3.

TABLE 3

Oxypyrolysis purification results of landfill leachate by $V_2O_5@SiO_2—Al_2O_3$ activated at different vacuum degrees

| Vacuum degree | COD removal rate (%) | COD concentration (mg/L) | Ammonia nitrogen removal rate (%) | Ammonia nitrogen concentration (mg/L) | Non-methane hydrocarbon (mg/m$^3$) |
|---|---|---|---|---|---|
| 15 | 99.3 | 58.2 | 98.6 | 17.6 | 36.5 |
| 20 | 99.9 | 7.8 | 99.4 | 7.8 | 10.4 |
| 25 | 99.1 | 75.8 | 98.3 | 21.9 | 51.1 |

Example 4

Other conditions were the same as those in Example 1, except that the dosages of the acidic chelating agent were replaced with 30 μL (31.4 mg) and 40 μL (41.8 mg), respectively.

The prepared hi-functional catalysts were $Fe_2O_3@SiO_2—Al_2O_3$-30 (the dosage of the acidic chelating agent was 30 μL) and $Fe_2O_3@SiO_2—Al_2O_3$-40 (the dosage of the acidic chelating agent was 40 μL). The acid contents of the prepared catalysts were 3.1 mmol/g and 2.3 mmol/g, respectively. The hydrogen consumption of the catalyst was 11.6 mmol/g and 8.5 mmol/g. The pore volumes of the catalysts were 1.3 cm$^3$/g and 0.8 cm/g, respectively, and the corresponding pore sizes ranged from 3.6 nm to 18.5 nm. The performance test of the catalyst was conducted according to Example 1. The selected landfill leachate had a COD concentration of 5186 mg/L and an ammonia nitrogen concentration of 2045 mg/L. The COD removal rate, the COD concentration, the ammonia nitrogen removal rate, the ammonia nitrogen concentration and the non-methane hydrocarbon concentration of the landfill leachate are listed in Table 4.

TABLE 4

Oxypyrolysis purification results of landfill leachate by $Fe_2O_3@SiO_2—Al_2O_3$with different addition amounts of acidic chelating agent

| Catalyst | COD removal rate (%) | COD concentration (mg/L) | Ammonia nitrogen removal rate (%) | Ammonia nitrogen concentration (mg/L) | Non-methane hydrocarbon (mg/m$^3$) |
|---|---|---|---|---|---|
| $Fe_2O_3@SiO_2—Al_2O_3$-30 | 99.0 | 49.9 | 99.4 | 12.3 | 28.2 |
| $Fe_2O_3@SiO_2—Al_2O_3$-40 | 98.3 | 88.1 | 98.9 | 22.7 | 51.3 |

When the acidic chelating agent was 30 μL, the hi-functional catalyst had the highest purification efficiency for organic pollutants and ammonia nitrogen in the landfill leachate. The COD and ammonia nitrogen concentrations of the oxypyrolysis purified effluent were 49.9 mg/L and 12.3 mg/L, respectively. The non-methane hydrocarbon was 28.2 mg/m$^3$.

Example 5

Except for the replacement of the monometallic complex Fe-MIL-101 with monometallic complexes Fe-MIL-100 (MIL-100(Fe)), Fe-MIL-68(MIL-68(Fe)), Cr-MIL-101 (MIL-101(Cr)), Ce-MOF-808(MOF-808(Zr)), V-MIL-101, Mn-MIL-100 and Cu-PCN-222(PCN-222(Cu)), the rest conditions were the same as those in Example 1. The prepared bi-functional catalysts were $Fe_2O_3@SiO_2—Al_2O_3$-7, $Fe_2O_3@SiO_2—Al_2O_3$-8, $Cr_2O_3@SiO_2—Al_2O_3$, $CeO_2@SiO_2—Al_2O_3$, $V_2O_5@SiO_2—Al_2O_3$, $Mn_2O_3@SiO_2—Al_2O_3$ and $CuO@SiO_2—Al_2O_3$, respectively.

The COD concentration of the landfill leachate was 8327 mg/L, and the ammonia nitrogen concentration was 1263 mg/L. The performance test of the catalyst was conducted according to Example 1. The COD removal rate, the COD concentration, the ammonia nitrogen removal rate, the ammonia nitrogen concentration and the non-methane hydrocarbon concentration of the landfill leachate are listed in Table 5.

TABLE 5

Oxypyrolysis purification results of landfill leachate by different monometallic encapsulated catalysts

| Catalyst | COD removal rate (%) | COD concentration (mg/L) | Ammonia nitrogen removal rate (%) | Ammonia nitrogen concentration (mg/L) | Non-methane hydrocarbon ($mg/m^3$) |
|---|---|---|---|---|---|
| $Fe_2O_3$@$SiO_2$—$Al_2O_3$-7 | 99.1 | 74.9 | 98.9 | 14.1 | 21.7 |
| $Fe_2O_3$@$SiO_2$—$Al_2O_3$-8 | 98.8 | 96.4 | 98.1 | 24.5 | 35.2 |
| $Cr_2O_3$@$SiO_2$—$Al_2O_3$ | 99.9 | 9.1 | 99.2 | 10.1 | 13.7 |
| $CeO_2$@$SiO_2$—$Al_2O_3$ | 99.9 | 11.7 | 98.7 | 16.4 | 14.9 |
| $V_2O_5$@$SiO_2$—$Al_2O_3$ | 99.8 | 14.6 | 98.8 | 15.2 | 15.3 |
| $Mn_2O_3$@$SiO_2$—$Al_2O_3$ | 99.8 | 16.6 | 98.1 | 23.5 | 22.1 |
| CuO@$SiO_2$—$Al_2O_3$ | 99.7 | 22.1 | 99.4 | 7.6 | 15.3 |

The selected monometallic complex encapsulated amorphous silica-alumina catalyst had a COD removal rate of 98.8% or above and an ammonia nitrogen removal rate of 98.1% or above for the landfill leachate.

Example 6

Except for the replacement of the monometallic complex Fe-MIL-101 with the bimetallic complexes Fe/Cu-MIL-101, Fe/Co-MIL-101, Fe/Mn-MIL-101, V/Cu-MIL-101, Cr/Cu-MIL-101, V/Cr-MIL-101, V/Mn-MIL-101, Fe/Cu-MIL-68, V/Cu-MIL-68, Ce/Cu-MOF-808, Ce/V-MOF-808, Ce/Mn-MOF-808, Ce/Mn-MIL-100, Fe/Cu-MIL-100 and Cu/Mn-PCN-222, other conditions were the same as those in Example 1.

Method for preparing MIL-101 type bimetallic complex: 1.66 g of terephthalic acid, metal 1 (see table below for type and dosage), and metal 2 (see table below for type and dosage) were dissolved in 150 mL of N, N-dimethylformamide solution, and reacted at 110° C. for 30 h in a constant-temperature oven. After the reaction, the bimetallic complex was filtered and washed with 300 mL of N, N-dimethylfomamide, and 300 mL of acetone, and then vacuum drying was performed at 80° C. to obtain a sample Fe/Cu-MIL-101.

Components and Dosages of MIL-101 Type Bimetallic Complex

| MIL-101 type bimetallic complex | Metal 1 (dosage, g) | Metal 2 (dosage, g) |
|---|---|---|
| Fe/Cu-MIL-101 | Ferric chloride hexahydrate (4.5 g) | Copper nitrate trihydrate (2 g) |
| Fe/Co-MIL-101 | Ferric chloride hexahydrate (4.5 g) | Cobalt nitrate hexahydrate (2 g) |
| Fe/Mn-MIL-101 | Ferric chloride hexahydrate (4.5 g) | Manganese chloride tetrahydrate (2 g) |
| V/Cu-MIL-101 | Vanadium chloride (4.5 g) | Copper nitrate trihydrate (2 g) |
| Cr/Cu-MIL-101 | Chromium nitrate nonahydrate (4.5 g) | Copper nitrate trihydrate (2 g) |
| V/Cr-MIL-101 | Vanadium chloride (4.5 g) | Chromium nitrate nonahydrate (2 g) |
| V/Mn-MIL-101 | Vanadium chloride (4.5 g) | Manganese chloride tetrahydrate (2 g) |

Method for preparing MIL-68 type bimetallic complex: except for changing the reaction temperature to 180° C., other conditions were the same as those of the method for preparing the MIL-101 type bimetallic complex.

Components and Dosages of MIL-68 Type Bimetallic Complex

| MIL-68 type bimetallic complex | Metal 1 (dosage, g) | Metal 2 (dosage, g) |
|---|---|---|
| Fe/Cu-MIL-68 | Ferric chloride hexahydrate (4.5 g) | Copper nitrate trihydrate (2 g) |
| V/Cu-MIL-68 | Vanadium chloride (4.5 g) | Copper nitrate trihydrate (2 g) |

Method for preparing MOF-808 type bimetallic complex: except for changing the terephthalic acid to trimesic acid and reaction time to 2 h, other conditions were the same as those of the method for preparing the MIL-101 type bimetallic complex.

Components and Dosages of MOF-808 Type Bimetallic Complex

| MOF-808 type bimetallic complex | Metal 1 (dosage, g) | Metal 2 (dosage, g) |
|---|---|---|
| Ce/Cu-MOF-808 | Cerium nitrate hexahydrate (4.5 g) | Copper nitrate trihydrate (2 g) |
| Ce/V-MOF-808 | Cerium nitrate hexahydrate (4.5 g) | Vanadium chloride (2 g) |
| Ce/Mn-MOF-808 | Cerium nitrate hexahydrate (4.5 g) | Manganese chloride tetrahydrate (2 g) |

Method for preparing MIL-100 type bimetallic complex: except for changing the terephthalic acid to trimesic acid, other conditions were the same as those of the method for preparing the MIL-101 type bimetallic complex.

Components and Dosages of MIL-100 Type Bimetallic Complex

| MIL-100 type bimetallic complex | Metal 1 (dosage, g) | Metal 2 (dosage, g) |
|---|---|---|
| Ce/Mn-MIL-100 | Cerium nitrate hexahydrate (4.5 g) | Manganese chloride tetrahydrate (2 g) |
| Fe/Cu-MIL-100 | Ferric chloride hexahydrate (4.5 g) | Copper nitrate trihydrate (2 g) |

Method for preparing PCN-222 type bimetallic complex: except for changing the terephthalic acid to porphyrin and the reaction temperature to 100° C., other conditions were the same as those of the method for preparing the MIL-101 type bimetallic complex.

Components and Dosages of Cu/Mn-PCN-222

| | Metal 1 (dosage, g) | Metal 2 (dosage, g) |
|---|---|---|
| Cu/Mn-PCN-222 | Copper nitrate trihydrate (4.5 g) | Manganese chloride tetrahydrate (2 g) |

Thus, the bi-functional catalysts prepared were $Fe_2O_3$—$CuO@SiO_2$—$Al_2O_3$-1, $Fe_2O_3$—$Co_3O_4@SiO_2$—$Al_2O_3$, $Fe_2O_3$—$Mn_2O_3@SiO_2$—$Al_2O_3$, $V_2O_5$—$CuO@SiO_2$—$Al_2O_3$-1, $Cr_2O_3$—$CuO@SiO_2$—$Al_2O_3$, $V_2O_5$—$Cr_2O_3@SiO_2$—$Al_2O_3$, $V_2O_5$—$Mn_2O_3@SiO_2$—$Al_2O_3$, $Fe_2O_3$—$CuO@SiO_2$—$Al_2O_3$-2, $V_2O_5$—$CuO@SiO_2$—$Al_2O_3$-2, $CeO_2$—$CuO@SiO_2$—$Al_2O_3$, $CeO_2$—$V_2O_5@SiO_2$—$Al_2O_3$, $CeO_2$—$Mn_2O_3@SiO_2$—$Al_2O_3$, $Fe_2O_3CuO@SiO_2$—$Al_2O_3$-3 and $CuO$—$Mn_2O_3@SiO_2$—$Al_2O_3$, respectively.

The COD concentration of the landfill leachate was 8327 mg/L, and the ammonia nitrogen concentration was 1263 mg/L. The performance test of the catalyst was conducted according to Example 1. The COD removal rate, the COD concentration, the ammonia nitrogen removal rate, the ammonia nitrogen concentration and the non-methane hydrocarbon concentration of the landfill leachate are listed in Table 6.

TABLE 6

Oxypyrolysis purification results of landfill leachate by different bimetallic encapsulated catalysts

| Catalyst | COD removal rate (%) | COD concentration (mg/L) | Ammonia nitrogen removal rate (%) | Ammonia nitrogen concentration (mg/L) | Non-methane hydrocarbon ($mg/m^3$) |
|---|---|---|---|---|---|
| $Fe_2O_3$—$CuO@SiO_2$—$Al_2O_3$-1 | 99.9 | 4.6 | 99.7 | 3.8 | 10.6 |
| $Fe_2O_3$—$Co_3O_4@SiO_2$—$Al_2O_3$ | 99.9 | 5.3 | 99.7 | 4.1 | 11.2 |
| $Fe_2O_3$—$Mn_2O_3@SiO_2$—$Al_2O_3$ | 99.9 | 6.8 | 99.7 | 4.3 | 10.5 |
| $V_2O_5$—$CuO@SiO_2$—$Al_2O_3$-1 | 99.9 | 5.3 | 99.8 | 2.6 | 16.7 |
| $Cr_2O_3$—$CuO@SiO_2$—$Al_2O_3$ | 99.9 | 8.4 | 99.6 | 5.1 | 15.2 |
| $V_2O_5$—$Cr_2O_3@SiO_2$—$Al_2O_3$ | 99.9 | 7.6 | 99.6 | 4.9 | 13.5 |
| $V_2O_5$—$Mn_2O_3@SiO_2$—$Al_2O_3$ | 99.9 | 7.2 | 99.6 | 4.8 | 14.3 |
| $Fe_2O_3$—$CuO@SiO_2$—$Al_2O_3$-2 | 99.8 | 15.9 | 99.4 | 7.6 | 16.5 |
| $V_2O_5$—$CuO@SiO_2$—$Al_2O_3$-2 | 99.7 | 21.8 | 99.2 | 10.6 | 22.3 |
| $CeO_2$—$CuO@SiO_2$—$Al_2O_3$ | 99.8 | 16.5 | 99.3 | 8.8 | 19.6 |
| $CeO_2$—$V_2O_5@SiO_2$—$Al_2O_3$ | 99.8 | 17.9 | 99.3 | 8.9 | 18.8 |
| $CeO_2$—$Mn_2O_3@SiO_2$—$Al_2O_3$ | 99.9 | 8.9 | 99.5 | 5.7 | 17.2 |
| $Fe_2O_3$—$CuO@SiO_2$—$Al_2O_3$-3 | 99.8 | 16.3 | 99.3 | 8.8 | 23.6 |
| $CuO$—$Mn_2O_3@SiO_2$—$Al_2O_3$ | 99.8 | 15.3 | 99.3 | 9.1 | 12.1 |

The selected bimetallic complex encapsulated amorphous silica-alumina catalyst had a COD removal rate of 99.8% or above and an ammonia nitrogen removal rate of 98.1% or above for the landfill leachate.

Example 7

Landfill leachate generated in different landfill stages was selected, with an LL1: COD concentration of 8327 mg/L and an ammonia nitrogen concentration of 1263 mg/L, an LL-2: COD concentration of 42064 mg/L and an ammonia nitrogen concentration of 853 mg/L, and an LL-3: COD concentration of 78426 mg/L and an ammonia nitrogen concentration of 692 mg/L. The catalyst $Fe_2O_3@SiO_2$—$Al_2O_3$-1 prepared in Example 1 was employed, and the reaction conditions were as follows: the reaction pressure was 0.2 MPa, the reaction temperature was 3501° C., the feed molar ratio of oxygen to landfill leachate was 2.3, and the space velocity was 1.5 $h^{-1}$. The COD removal rate, the COD concentration, the ammonia nitrogen removal rate, the ammonia nitrogen concentration and the non-methane hydrocarbon concentration of the landfill leachate are listed in Table 7.

TABLE 7

Oxypyrolysis purification results of landfill leachate at different COD and ammonia nitrogen concentrations

| Catalyst | COD removal rate (%) | COD concentration (mg/L) | Ammonia nitrogen removal rate (%) | Ammonia nitrogen concentration (mg/L) | Non-methane hydrocarbon ($mg/m^3$) |
|---|---|---|---|---|---|
| LL-1 | 99.9 | 8.7 | 99.4 | 7.3 | 12.6 |
| LL-2 | 99.9 | 36.2 | 99.0 | 8.8 | 14.8 |
| LL-3 | 99.9 | 93.8 | 99.2 | 5.4 | 13.0 |

The $Fe_2O_3@SiO_2$—$Al_2O_3$-1 bi-functional catalyst had a COD removal rate of 99.9% or above and an ammonia nitrogen removal rate of 99.0% or above for pollutants in the leachate.

Example 8

The oxypyrolysis treatment process of the landfill leachate was also influenced by the temperature of the oxypyrolysis reaction. The catalyst $Fe_2O_3@SiO_2$—$Al_2O_3$-1 prepared in Example 1 was employed. The landfill leachate sample in Example 1 was selected. The temperature of the oxypyrolysis reaction was changed according to the feed molar ratio of oxygen to landfill leachate and the space velocity in the catalyst performance test of Example 3. The COD removal rate, COD concentration and ammonia nitrogen removal rate, ammonia nitrogen concentration, and non-methane hydrocarbon concentration of the landfill leachate are listed in Table 8.

TABLE 8

Oxypyrolysis purification results of landfill leachate at different reaction temperatures

| Reaction temperature | COD removal rate (%) | COD concentration (mg/L) | Ammonia nitrogen removal rate (%) | Ammonia nitrogen concentration (mg/L) | Non-methane hydrocarbon ($mg/m^3$) |
|---|---|---|---|---|---|
| 250 | 99.4 | 49.9 | 99.5 | 6.5 | 46.9 |
| 350 | 99.9 | 7.9 | 98.6 | 17.7 | 12.6 |
| 450 | 99.0 | 84.8 | 98.1 | 24.1 | 52.1 |

When the reaction temperature was 350° C., the removal efficiency of the organic pollutants in the landfill leachate reached the highest.

Example 9

The oxypyrolysis treatment process of the landfill leachate was also influenced by the feed molar ratio of oxygen to landfill leachate of the oxypyrolysis process. The catalyst $Fe_2O_3$@$SiO_2$—$Al_2O_3$-1 prepared in Example 1 was employed. The landfill leachate sample in Example 1 was selected. The feed molar ratio of oxygen to landfill leachate was changed according to the reaction temperature and space velocity in the performance test of the catalyst in Example 1. The COD removal rate, COD concentration and ammonia nitrogen removal rate, ammonia nitrogen concentration, and non-methane hydrocarbon concentration of the landfill leachate are listed in Table 9.

TABLE 9

Oxypyrolysis purification results of landfill leachate at different feed molar ratios of oxygen to landfill leachate

| Feed molar ratio of oxygen to landfill leachate | COD removal rate (%) | COD concentration (mg/L) | Ammonia nitrogen removal rate (%) | Ammonia nitrogen concentration (mg/L) | Non-methane hydrocarbon ($mg/m^3$) |
|---|---|---|---|---|---|
| 0.1 | 99.2 | 66.6 | 98.4 | 20.2 | 46.5 |
| 2.3 | 99.9 | 7.4 | 99.4 | 7.7 | 12.4 |
| 5.0 | 99.1 | 75.8 | 98.3 | 21.9 | 51.1 |

When the feed molar ratio of oxygen to landfill leachate was 2.3, the purification efficiency of the landfill leachate was the highest, with COD and ammonia nitrogen concentrations of purified water being 7.4 mg/L and 7.7 mg/L, respectively.

Example 10

A catalyst stability test was conducted on the catalyst $Fe_2O_3$@$SiO_2$—$Al_2O_3$-1 prepared in Example 1 according to Example 1. A leachate oxypyrolysis purification device operated stably for 100 h, and the catalyst did not exhibit obvious inactivation. The catalyst had an excellent purification effect on the organic pollutants in the landfill leachate, and the stability of the catalyst also reached 100 h.

Comparative Example 1

1.6875 g of ferric trichloride hexahydrate was completely dissolved in 20 mL of deionized water, After dissolution 9.5 g of HY molecular sieve with a silica-alumina ratio of 5:1 was added and stirred for 12 h, and then the mixture was placed in a 100° C. oil bath pan and stirred slowly to remove water. Then the water-removed mixture was placed in a tube furnace and heated at 5° C./min in an air atmosphere to 600° C. for heat treatment for 3 h. The catalyst was named $Fe_2O_3$/HY-5. The performance test of the catalyst was conducted in a three-stage temperature controlled fluidized bed steel reactor, with a COD concentration of landfill leachate of 8327 mg/L and an ammonia nitrogen concentration of 1263 mg/L. Oxypyrolysis purification of landfill leachate was performed with the bi-functional catalyst prepared by the above-mentioned method. The catalyst was loaded into a fluidized bed reaction tube, and the landfill leachate was added into a reactor through a peristaltic pump. The reaction conditions were as follows: the reaction temperature was 350° C., the feed molar ratio of oxygen to landfill leachate was 2.3, and the space velocity was $1.5 \cdot h^{-1}$ The COD removal rate was 92.1%, and the ammonia nitrogen removal rate was 79.5%. The COD concentration of the effluent was as high as 657.8 mg/L, and the ammonia nitrogen concentration was as high as 258.9 mg/L, which did not meet the discharge standards. The long-term stability effect of the purification reaction was poor, and after only for 22 h, there was significant deactivation of the catalyst, so that the catalytic efficiency was greatly reduced.

Comparative Example 2

1.1419 g of cerium nitrate hexahydrate was completely dissolved in 20 mL of deionized water. After dissolution, 9.5 g of amorphous silica-alumina with a silica-alumina ratio of 5:1 was added and stirred for 12 h, and then the mixture was placed in a 100° C. oil bath pan and stirred slowly to remove water. Then, the water-removed mixture was placed in a tube furnace and heated at 5° C./min in an air atmosphere to 600° C. for heat treatment for 3 h. The catalyst was named $CeO_2$/$SiO_2$—$Al_2O_3$-5. The leachate was purified according to the process conditions of Comparative example 1, and thus, the COD concentration removal rate was 94.6% and the ammonia nitrogen removal rate was 813%. The COD concentration of the effluent was as high as 449.7 mg/L, and the ammonia nitrogen concentration was as high as 236.2 mg/L. The long-term stability of the purification reaction was slightly improved compared to that of the catalyst prepared in Comparative example 1, but only after 42 h, there was a significant deactivation of the catalyst, so that the catalytic efficiency was greatly reduced.

What is claimed is:

1. A method for preparing an amorphous silica-alumina encapsulated metal oxide catalyst, comprising the following steps:

placing a metal complex in a vacuum drying device, performing activation at a temperature of 80-120° C. and a vacuum degree of 15-25 Pa for 4-6 h to form an activated metal complex, and then soaking the activated metal complex in a mixed solution of a silicon precursor, an aluminum precursor, an acidic chelating agent and a hydrolysis inhibitor for 3-4 h to form a soaked sample; and after washing the soaked sample with an alcohol solvent and drying the same to remove the solvent to obtain a solid, performing heat treatment on the obtained solid at a temperature of 500-800° C. for 4-6 h to remove organic components to obtain an MOx@SiO2-Al2O3bi-functional oxypyrolysis catalyst with dispersed acidic sites and oxygen vacancies and a tunnel structure.

2. The method for preparing an amorphous silica-alumina encapsulated metal oxide catalyst according to claim 1, wherein the metal oxide MOx is one or two of Fe2O3, Co3O4, Cr2O3, CeO2, V2O5, Mn2O3 and CuO.

3. The method for preparing an amorphous silica-alumina encapsulated metal oxide catalyst according to claim 1, wherein the metal complex is one of MIL-101, MIL-100, MIL-68, MOF-808 and PCN-222 crystal structures; of the metal complex is one of Fe-MIL-101, Fe-MIL-100, Fe-MIL-68, Fe-MIL-100, Cr-MIL-101, Ce-MOF-808, V-MIL-101, V-MIL-68, Mn-MIL-100 and Cu-PCN-222; or the metal complex is one of Fe/Cu-MIL-101, Fe/Co-MIL-101, Fe/Mn-MIL-101, V/Cu-MIL-101, Cr/Cu-MIL-101, V/Cr-MIL-101, V/Mn-MIL-101, Fe/Cu-MIL-68, V/Cu-MIL-68, Ce/Cu-MOF-88, Ce/V-MOF-88, Ce/Mn-MOF-88, Ce/Mn-MIL-100, Fe/Cu-MIL-100 and Cu/Mn-PCN-222.

4. The method for preparing an amorphous silica-alumina encapsulated metal oxide catalyst according to claim 1, wherein the silicon precursor is one of tetramethoxysilane, tetraethyl orthosilicate and methyltrimethoxysilane; and the mass ratio of silicon precursor to metal complex is 9:1 to 11.8:1.

5. The method for preparing an amorphous silica-alumina encapsulated metal oxide catalyst according to claim 1, wherein the aluminum precursor is one of aluminum isopropoxide, aluminum tri-sec-butoxide, and aluminum di(sec-butoxide) acetoacetate; and the mass ratio of aluminum precursor to silicon precursor is 0.11:1 to 0.37:1.

6. The method for preparing an amorphous silica-alumina encapsulated metal oxide catalyst according to claim 1, wherein the acidic chelating agent is one of acetic acid and oxalic acid, the hydrolysis inhibitor is at least one of ethyl acetoacetate and an alcohol, and the alcohol is isopropanol or sec-butanol;

the mass ratio of ethyl acetoacetate to aluminum precursor is 0.1:1 to 0.3:1; and the mass ratio of alcohols to aluminum precursor is 1.6:1 to 4.7:1.

7. The method for preparing an amorphous silica-alumina encapsulated metal oxide catalyst according to claim 1, wherein the mass ratio of acidic chelating agent to aluminum precursor is 0.21:1 to 0.63:1; and the alcohol solvent is one or two of methanol, ethanol and sec-butanol.

8. The method for preparing an amorphous silica-alumina encapsulated metal oxide catalyst according to claim 1, wherein the acid content of the bi-functional catalyst is 2.3-4.5 mmol/g, and the hydrogen consumption of an oxidation active component is 8.5-17.5 mmol/g; and the pore volume of the bi-functional catalyst is 0.8 to 1.7 $cm^3/g$, and the mesoporous pore sizes range from 2.2 nm to 18.5 nm.

9. An amorphous silica-alumina encapsulated metal oxide catalyst, wherein the catalyst is prepared by using the method according to claim 1.

10. A method comprising additionally subjecting the amorphous silica-alumina encapsulated metal oxide catalyst prepared by the preparation method according to claim 1 to oxypyrolysis purification of landfill leachate, wherein further, the catalyst converts carbon/nitrogen pollutants in the landfill leachate into carbon dioxide, water and nitrogen through aerobic cracking tandem reaction.

11. The method according to claim 10, wherein a catalytic reaction is conducted for the oxypyrolysis purification reaction of the landfill leachate in a circulating fluidized bed reactor; both the air and the landfill leachate are fed from the bottom of an oxypyrolysis reactor;

the COD concentration of the landfill leachate is 1000-100000 mg/L, and the ammonia nitrogen concentration is 500-5000 mg/L; the reaction pressure is 0.1-0.2 MPa;

the catalytic reaction temperature is 250-450° C.;

the feed molar ratio of oxygen to landfill leachate is 0.1 to 5; and the space velocity is 0.5-3.5 h-1.

12. The method according to claim 11, wherein the catalytic reaction temperature is 300-400° C.

* * * * *